United States Patent
Sim et al.

(10) Patent No.: US 7,603,132 B2
(45) Date of Patent: Oct. 13, 2009

(54) DATA TRANSMITTING AND RECEIVING APPARATUS AND METHOD FOR A DIGITAL MOBILE STATION

(75) Inventors: Seng-Wook Sim, Suwon-shi (KR); Joung-Kyou Park, Seoul (KR); Ki-Sang Jeon, Yongin-shi (KR); Yong-Jin Lee, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/127,881

(22) Filed: May 12, 2005

(65) Prior Publication Data

US 2005/0215271 A1   Sep. 29, 2005

Related U.S. Application Data

(63) Continuation of application No. 09/531,658, filed on Mar. 20, 2000, now Pat. No. 6,920,331.

(30) Foreign Application Priority Data

Mar. 19, 1999  (KR) .................................. 1999-9435

(51) Int. Cl.
  *H04Q 7/32*  (2006.01)
  *H04Q 7/20*  (2006.01)

(52) U.S. Cl. ................. 455/466; 455/414.1; 455/414.4; 370/474

(58) Field of Classification Search .................. 370/236; 455/412.1, 466, 412.2
See application file for complete search history.

(56) References Cited

U.S. PATENT DOCUMENTS 5,446,678 A   8/1995   Saltzstein et al. ........... 364/514

(Continued)

FOREIGN PATENT DOCUMENTS

CA   2190305   6/1997

(Continued)

OTHER PUBLICATIONS

Nokia Phone 6190 Owner's Manual.

(Continued)

*Primary Examiner*—George Eng
*Assistant Examiner*—Brandon J Miller
(74) *Attorney, Agent, or Firm*—Cha & Reiter, LLC

(57) ABSTRACT

Disclosed is an apparatus and method of communicating data for a digital mobile station, and more particularly a data transmitting and receiving apparatus and method capable of transmitting and receiving graphic and/or data using a Short Message Service (SMS). According to the present invention, an SMS message comprises an SMS header field and an SMS user data field, wherein the SMS user data field comprises a data transmission header field and a data field. The data transmission header field comprises a code field to indicate one of plural types of data associated with data contained in the data field of the SMS user data field, a data transmitting and receiving apparatus and method capable of transmitting and receiving graphic and/or audio data using a Short Message Service (SMS). Further, an SMS message comprises an SMS header field and an SMS user data field, wherein the SMS user data field comprises a data transmission header field and a data field. The data transmission header field comprises a code field to indicate one of plural types of data associated with data contained in the data field of the SMS user data field. The SMS message is communicated though SMS network.

46 Claims, 12 Drawing Sheets

U.S. PATENT DOCUMENTS

| | | | |
|---|---|---|---|
| 6,021,433 A | 2/2000 | Payne et al. | 709/219 |
| 6,157,815 A | 12/2000 | Collins et al. | 455/38.1 |
| 6,175,743 B1 * | 1/2001 | Alperovich et al. | 455/466 |
| 6,208,659 B1 * | 3/2001 | Govindarajan et al. | 370/410 |
| 6,230,019 B1 * | 5/2001 | Lee | 455/466 |
| 6,243,081 B1 | 6/2001 | Goris et al. | 345/202 |
| 6,292,668 B1 * | 9/2001 | Alanara et al. | 455/466 |
| 6,320,595 B1 | 11/2001 | Simons et al. | 345/619 |
| 6,356,759 B1 * | 3/2002 | Mustajarvi | 455/450 |
| 6,400,942 B1 * | 6/2002 | Hansson et al. | 455/426.1 |
| 6,430,409 B1 | 8/2002 | Rossmann | 455/422 |
| 6,512,779 B1 * | 1/2003 | Vollmer et al. | 370/470 |
| 6,920,331 B1 * | 7/2005 | Sim et al. | 455/466 |
| 6,977,321 B1 * | 12/2005 | Dath et al. | 585/653 |
| 6,977,921 B1 * | 12/2005 | Dolan | 370/352 |
| 6,987,980 B1 * | 1/2006 | Hans et al. | 455/466 |

FOREIGN PATENT DOCUMENTS

| | | |
|---|---|---|
| EP | 0782357 A2 | 12/1996 |
| EP | 0981252 A2 | 2/2000 |
| EP | 1039768 A2 | 9/2000 |
| GB | 2348082 A | 9/2000 |
| WO | WO 96/05691 | 2/1996 |
| WO | WO 97/30556 * | 2/1996 |
| WO | WO 97/30556 * | 8/1997 |
| WO | WO 97/32439 * | 9/1997 |

OTHER PUBLICATIONS

Nokia Press Releases.
Nokia; "Narrowband Sockets Specification;" Mar. 7, 1997.
Nokia; "Smart Messaging Specification;" Sep. 15, 1997.
Sony Ericsson; "GSM 3.40;" European Telecommunication Standard (ETS 300 901), Fourth Edition; Oct. 1998.
Expert Report of Tim Arthur Williams, Ph.D. Regarding Validity and Enforceability of U.S. Patent 6,920,331; Jan. 26, 2007.
Exhibit F—'331 Patent.Invalidity Claims Charts; Exhibit F of Expert Report of Tim Arthur Williams, Ph.D. Regarding Validity and Enforceability of U.S. Patent 6,920,331; Jan. 26, 2007.
Exhibit S—Construction of '331 Patent Claim Terms; Exhibit S of Expert Report of Tim Arthur Williams, Ph.D. Regarding Validity and Enforceability of U.S. Patent 6,920,331; Jan. 26, 2007.
Exhibit T—'331 Patent Corresponding Structure Chart; Exhibit T of Expert Report of Tim Arthur Williams, Ph.D. Regarding Validity and Enforceability of U.S. Patent 6,920,331; Jan. 26, 2007.
Rebuttal Expert Report of Dr. Nathaniel Polish, Ph.D. to the Report of Tim Arthur Williams Regarding Validity and Enforceability of U.S. Patent No. 6,920,331.

* cited by examiner

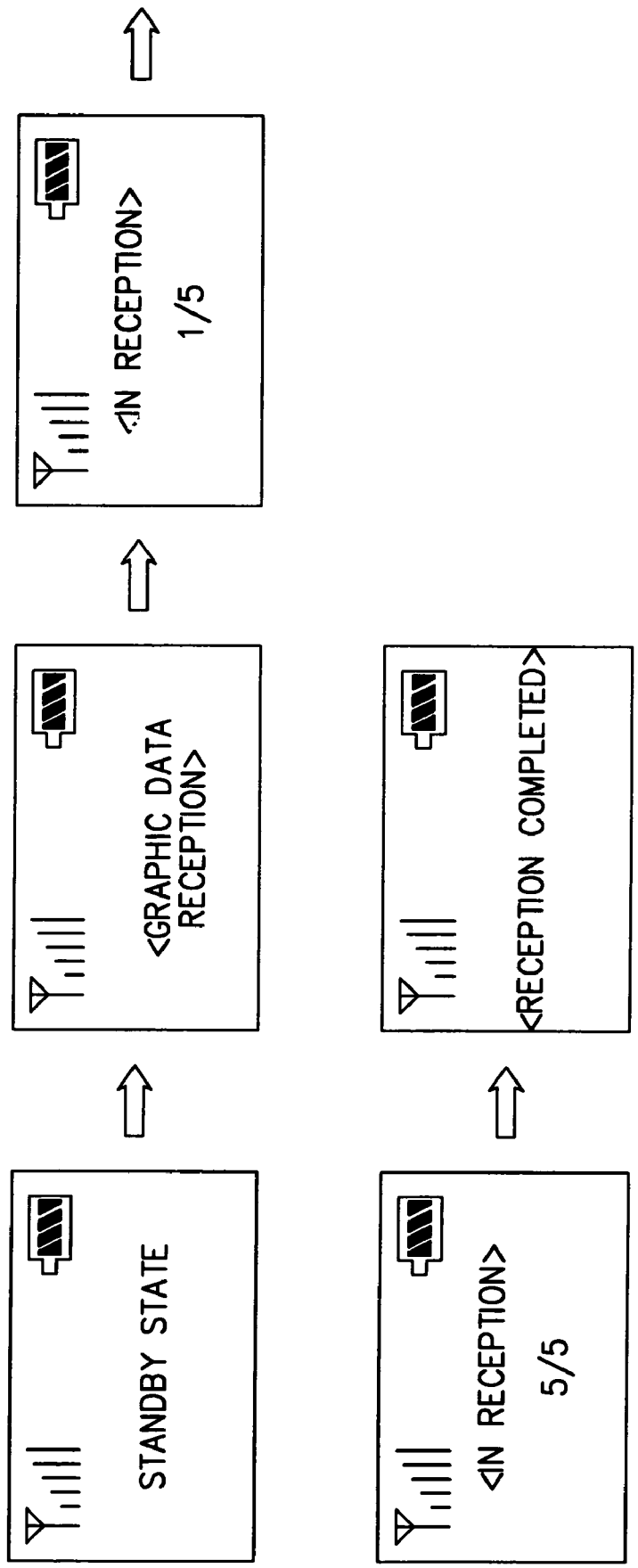

DATA TRANSMITTING AND RECEIVING APPARATUS AND METHOD FOR A DIGITAL MOBILE STATION

CROSS REFERENCE TO RELATED APPLICATION

This application related to a Continued Application of U.S. patent application Ser. No. 09/531,658 filed on Mar. 20, 2000 now U.S. Pat. No. 6,920,331.

BACKGROUND OF THE INVENTION

1. Field of the Invention

The present invention relates to an apparatus and method of transmitting and receiving storage data for a digital mobile station. More particularly, the present invention relates to a data transmitting and receiving apparatus and method which can transmit and receive a large capacity of data using a short message service.

2. Description of the Related Art

Typically, the user of a digital mobile terminal can make a sentence into blocks according to a short message service (SMS) specification whose internal construction is standardized. Using the SMS implemented in the mobile station, the mobile terminal can transmit the blocks to a receiving party. In order to effectuate the SMS, a plurality of functions for preparing, editing, and sending a series of characters or a sentence should be implemented in the mobile station by the digital mobile station system.

FIG. 1 shows the construction of the whole mobile station system where the SMS is performed. Referring to FIG. 1, if the user of a mobile station (MS) 10 prepares a sentence, inputs the phone number of the opposite party, and activates the send key, then the prepared sentence is constructed as blocks and transmitted to a base station (BS) 12 and a mobile switching center (MSC) connected to the base station 12 through an extra pilot channel as a radio signal. The transmitted SMS blocks are then transferred to a mobile terminal or a terminal equipment (TE) 16 that corresponds to the inputted phone number through a radio network or a public switched telephone network (PSTN) 14. Thereafter, the opposite party ascertains the transmitted character message by decoding the user data included in the transmitted SMS blocks.

In addition to the normal function of executing communication, the implementation of the SMS in the digital mobile station enables the mutual transmission or reception of a predetermined size characters, thus making it more convenient to the user. In other words, a user can separately prepare a sentence and transmit the sentence to the desired opposite party as a radio signal.

However, the conventional SMS has drawbacks in that the length of mutual data transmission or reception characters is limited. That is, only a specified amount of data determined by the system can be transferred between parties. Accordingly, the radio data transmission can be realized only for text characters with a relatively small amount of data. In other words, graphic data or audio data having a large amount of data relative to the sentence composed of the short characters cannot be transmitted through the SMS.

As a result, the conventional digital mobile station can transmit and receive only a relatively small amount of data through the SMS. Thus, the conventional digital mobile station can not transmit and receive a relatively large amount of data, such as graphic information. Accordingly, in order to transmit a large amount of data, a new system must be provided. Further, the use of another function is limited during the performance of the data service in the conventional digital mobile station.

According to the SMS of the conventional digital mobile station, as described above, the user can only prepare and transmit a short sentence due to the limited size of the data that can be included in the SMS block. Thus, it forces the user to prepare only limited data in transmitting the characters through the SMS. If the user intends to prepare and transmit the sentence with an amount of data larger than which could be included in the SMS block, the sentence must be divided into several sub-sentences prior to transmission. Each of the respective sub-sentences must then be separately prepared and transmitted, causing a great deal of inconvenience to the user. In other words, the transmission of the data with a large amount of data is practically impossible.

Consequently, the conventional digital mobile station has the problem since the user cannot widely use the SMS due to the limited capacity of the SMS in transmitting data, thus it can only transmit and receive a short message.

SUMMARY OF THE INVENTION

The present invention has been made in an effort to solve the problems occurring in the prior art. One object of the present invention is to provide a data transmitting and receiving apparatus and method for a digital mobile terminal that can transmit and receive a relatively large amount of data using a short message service. That is, the present invention provides an apparatus and method which can perform the mutual transmission and reception of a large amount of data between the originating and terminating parties using the typical SMS without constructing a separate device or system.

Another object of the present invention to provide a data transmitting and receiving apparatus and method which can transmit and receive graphic data and audio data having a relatively large amount of data by overcoming the limited capacity of the amount of data that can be transmitted by the SMS of a mobile station in the prior art.

It is still another object of the present invention to provide an SMS block having a new construction so that the transmission and the reception of a large amount of data can be achieved between digital mobile stations. The SMS block proposed by the present invention can be processed by a standard SMS processing method.

It is yet another object of the present invention to provide a data compression method for a digital mobile station which enables a large amount of data to be transmitted and received using the SMS block.

The embodiment of the present invention may provide a data communication method and apparatus for transmitting and/or receiving data such as graphic and/or audio using a Short Message Service (SMS) message. According to the embodiment of present invention, an SMS message comprises an SMS header field and an SMS user data field. Wherein, the SMS user data field comprises a data transmission header field and a data field. The data transmission header field comprises a code field to indicate one of plural types of data associated with data contained in the data field of the SMS user data field. The SMS message is communicated though SMS network.

In order to achieve the above object, there is provided a data transmitting method for a digital mobile station comprising the steps of: (1) reading and encoding stored data in a data transmission mode; (2) generating inherent distinction data transmission headers according to the completion of the data encoding; (3) forming the encoded data and the generated data transmission headers into the user data of a short message service; and, (4) transmitting short message service blocks including the user data of the short message service.

According to another aspect of the present invention, there is provided a data receiving method for a digital mobile station comprising the steps of: (1) detecting whether short message service blocks are received; (2) if the short message service blocks are received, detecting whether the detected blocks include predetermined, inherent distinction data transmission headers; (3) detecting whether the data transmission headers are included; (4) analyzing the headers and decoding the received short message service blocks according to the analysis result; and, (5) storing the decoded short message service blocks in succession to the previously processed short message service blocks.

According to still another aspect of the present invention, there is provided a method of constructing short message service blocks for a digital mobile station, comprising the steps of: (1) dividing encoded data into blocks of a predetermined unit; (2) generating inherent data transmission headers corresponding to the respective divided blocks and adding the generated headers to the divided blocks; and, (3) adding short message service headers to the blocks to which the transmission headers are added, respectively.

According to yet another aspect of the present invention, there is provided a short message service data block structure comprising a short message service header region, a transmitted data distinction region, a region for a whole number of blocks of encoded data, a region for a transmission order of the encoded data, a transmitting part distinction region, a region for distinction of a kind of the transmitted data, and a transmitted data region.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION

Figure 1:
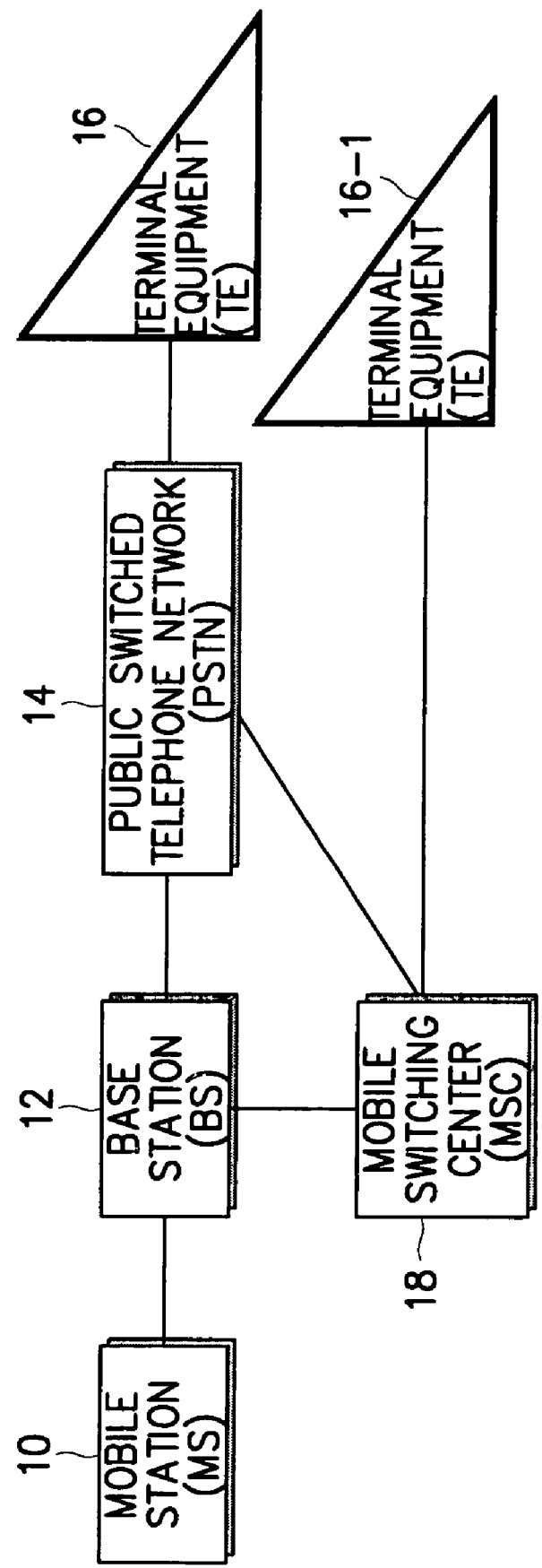
FIG. 1 is a block diagram illustrating the construction of a conventional digital mobile station system for performing a short message service.

A reference will now be made in greater detail to the preferred embodiments of the present invention. In the drawings, the same or similar elements are denoted by the same reference numerals even though they are depicted in different drawings. In the following description of the present invention, many specified items such as detailed circuit elements are indicated, but they are provided only for the whole understanding of the present invention, and thus it will be understood by those skilled in the art that the present invention can be performed without such specified items. For the purpose of clarity, a detailed description of known functions and configurations incorporated herein will be omitted as they may make the subject matter of the present invention unclear. Especially, the essential elements of the typical mobile station such as a dual tone multi-frequency (DTMF) section, a vocoder, etc., are not directly related to the subject matter of the present invention, hence a detailed explanation thereof will be omitted. However, such construction should be essentially provided in performing the present invention.

In explaining the preferred embodiment of the present invention with reference to the accompanying drawings, graphic data will be taken as an example of the data transmitted and received through the SMS. This is because the graphic data has a relatively a large amount of data in comparison to the character data, and thus it is judged that taking the graphic data as an example is preferable in explaining the preferred embodiment of the present invention. However, it should be noted that the performance of the present invention would be normally affected even though the graphic data is replaced by any other type of data.

Figure 2:
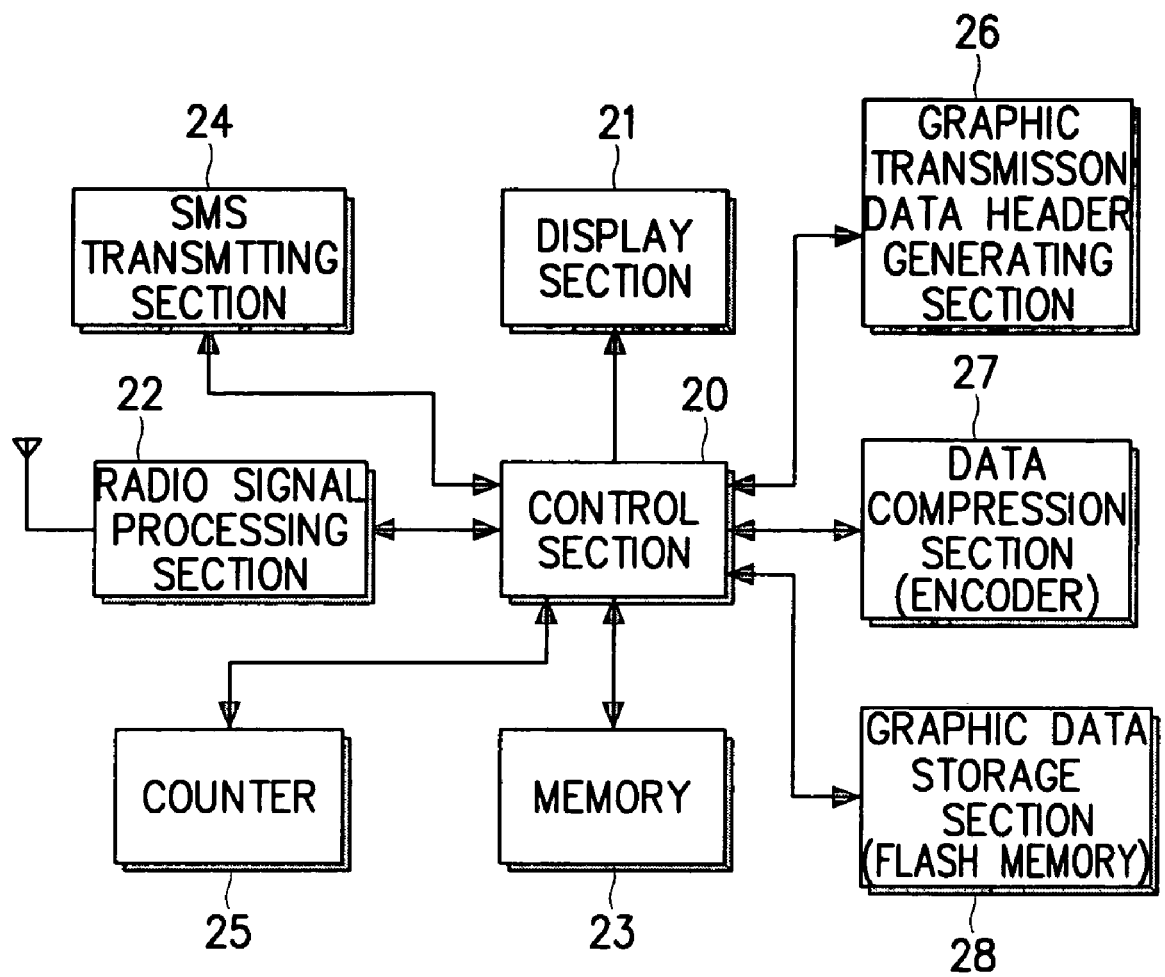
FIG. 2 is a block diagram illustrating the construction of a data transmitting apparatus for a digital mobile station according to the preferred embodiment of the present invention.

FIG. 2 is a block diagram illustrating the construction of a data transmitting apparatus for a digital mobile station using the SMS according to a preferred embodiment of the present invention.

Referring to FIG. 2, a control section 20 controls the whole operation of the digital mobile station, and the whole performance of a short message service according to the present invention. The control section 20 is typically implemented by a one-chip microprocessor. In the embodiment of the present invention, the control section 20 controls the compression of the graphic data, the production of the SMS block, the generation of a graphic transmission data header, the readout of the stored graphic data, and the operation of a bit counter.

A memory 23 includes a volatile memory (for example, RAM) and a non-volatile memory (for example, flash memory or EEPROM), and performs the storage of a program for controlling the whole operation of the digital mobile station, the storage of initial service data, and the storage of an operation program for the performance of the short message service, and the data produced according to the performance of the operation program. The memory also performs a buffer function for storing input and output data.

A display section 21 is a user interface device for displaying the whole state of the digital mobile station and input numerals and characters, and is typically implemented by a liquid crystal display (LCD) driven under the control of the control section 20. In the embodiment of the present invention, the display section 21 displays the transmission state of data transmitted under the control of the control section 20 in a specified form, so that the user can visually identify the state of the data transmitted.

A radio signal processing section 22 performs the whole processing of the radio signal transmission and reception between the digital mobile station and the base station to which the digital mobile station belongs. Specifically, the radio signal processing section 22 converts the input audio signal of a radio frequency band to an intermediate frequency (IF) signal, converts the IF signal to a baseband signal, and then converts the baseband signal to a digital signal. Also, in sending the audio signal, the radio signal processing section 22 performs an operation opposite to that described above. Meanwhile, a radio data transmission is performed by the radio signal processing section 22. That is, in the embodiment of the present invention, the produced SMS blocks are radio-transmitted under the operation of the radio signal processing section 22.

An SMS transmitting section 24 makes the prepared sentence and data into the SMS blocks. In making the data into the SMS blocks by the SMS transmitting section 24, the contents of the block are conformable to a standardized format. A typical format includes an SMS header field and an SMS user data field in constructing the SMS block. The SMS header field follows a determined rule, and the system provider properly determines the size of the SMS user data field. For instance, the Korean digital mobile station system providers determine the size of the SMS user data field to be 100 bytes or so, and this means that the sentence to be transmitted should be prepared as data of 100 bytes or so. Adding the SMS header to the prepared SMS user data field produces the SMS block by the SMS transmitting section 24. The produced SMS block is then transferred to the radio signal processing section 22 to affect the radio data transmission.

A graphic data storage section 28 stores the produced graphic data in a specified form. Specifically, the graphic data is stored in the form of bit streams having respective addresses, and thus the storage regions thereof are different according to the kinds of the graphic data. The data storage capacity is variably determined according to the storage capacity of the memory.

A data compression section 27 is additionally provided according to the embodiment of the present invention, and compresses the data prepared or read out to be transmitted. The data compression section 27 is typically called an encoder which compresses the data to be transmitted by a predetermined compression method. In transmitting the graphic data through the SMS, the data compression section 27 compresses the graphic data having a relatively large amount of data into data having a small amount of data without loss. According to the present invention, a data compression method based on a run length coding (RLC) method is implemented so that the compressed data is included in the SMS block. This is to be conformable to the fact that the graphic data expressed in the typical mobile station has two components of black and white. As a result, the data compression section 27 is implemented to compress the transmitted data according to the RLC method.

A graphic transmission data header generating section 26 generates an inherent distinction header for recognizing that the data compressed, and is transmitted as graphic data. In the present invention, the generated distinction header is called data transmission header and included in the SMS user data field of the SMS block. The format of the data transmission header generated according to the embodiment of the present invention will be explained hereinafter with reference to FIG. 4.

A counter 25 increases a specified variable according to the readout of the bits of the graphic data that is read out in the form of bit streams. This variable is defined as a counted value of bits and increases for the readout of one bit. Accordingly, the graphic data having a relatively large amount of data can be transmitted after being compressed and made into the SMS blocks by the data transmitting apparatus of FIG. 2. In the event that the amount of the compressed graphic data exceeds the data size which cannot be included in one SMS block, the data compression section 27 and the control section 20 process to produce another SMS block so as to transmit the large amount of data. That is, in the embodiment of the present invention, a plurality of SMS blocks are produced and transmitted if needed during the SMS transmission of the graphic data.

Figure 3:
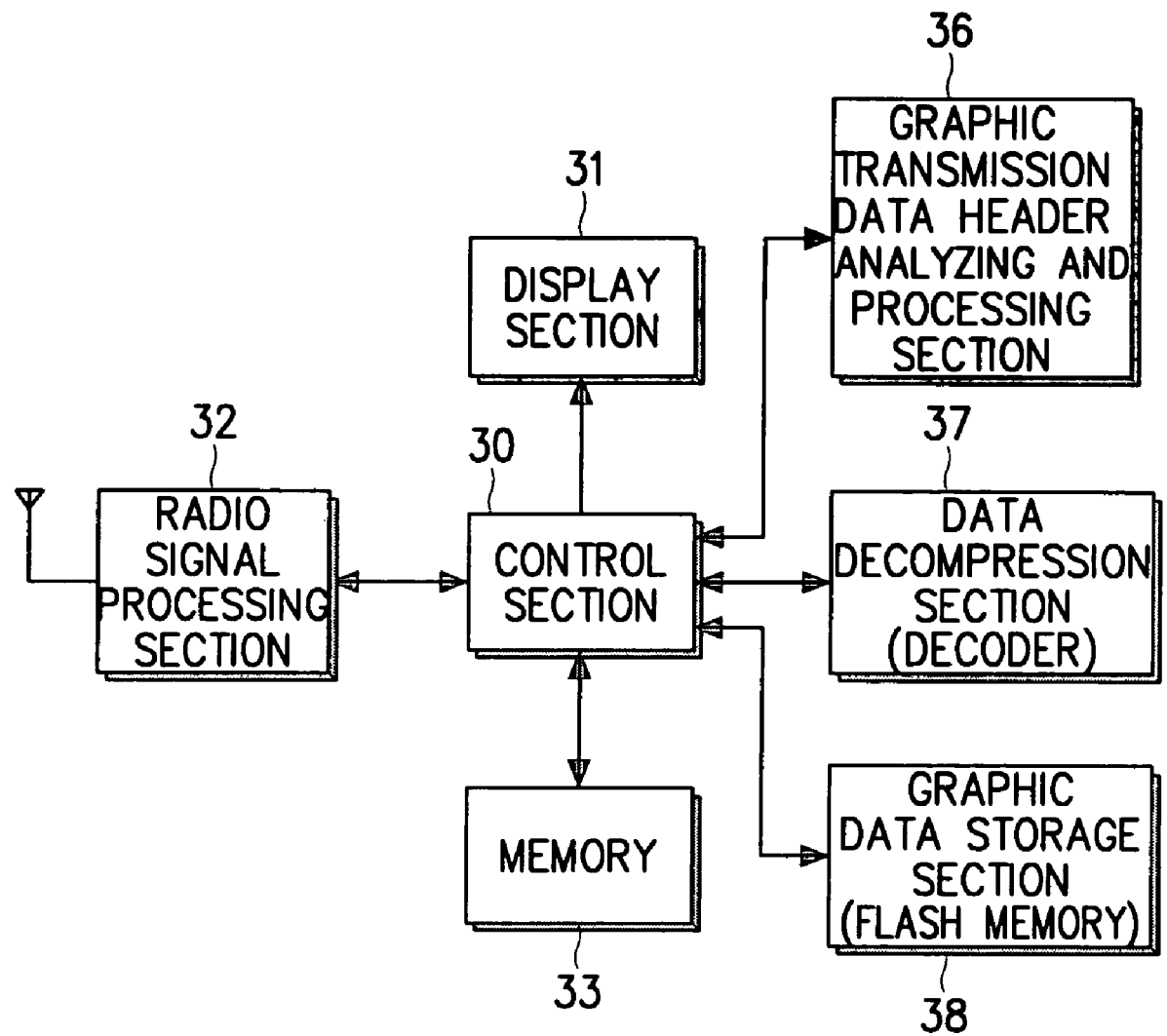
FIG. 3 is a block diagram illustrating the construction of a data receiving apparatus for a digital mobile station according to the preferred embodiment of the present invention.

FIG. 3 is a block diagram illustrating the construction of a data receiving apparatus for a digital mobile station using the SMS according to a preferred embodiment of the present invention.

Referring to FIG. 3, a control section 30 controls the whole operation of the digital mobile station, and the whole performance of a short message service according to the present invention in a manner similar to the control section of the data transmitting apparatus of FIG. 2. The control section 30 is typically implemented by a one-chip microprocessor. In the embodiment of the present invention, the control section 30 controls the decompression of the compressed graphic data included in the received SMS block, the analysis and process of the graphic transmission data header, and the storage of the decompressed graphic data.

A memory 33 includes a volatile memory and a non-volatile memory, and performs the storage of a program for controlling the whole operation of the data receiving apparatus of the digital mobile station, the storage of initial service data, and the storage of an operation program for the performance of the short message service, and the data produced according to the performance of the operation program according to the embodiment of the present invention. The memory also performs a buffer function for storing input and output data.

A display section 31 serves as a user interface device for displaying the whole state of the digital mobile station and input numerals and characters. In the embodiment of the present invention, the display section 31 displays the reception state of the data received under the control of the control section 30 in a specified form, so that the user can visually identify the data reception state.

A radio signal processing section 32 performs the same operation as the radio signal processing section 22 of the data transmitting apparatus shown in FIG. 2. The radio processing section 32 processes the additionally received SMS block and transfers the processed SMS block to the control section 30.

A graphic data storage section 38 stores the graphic data, which has been received and decompressed in a specified form. Specifically, the graphic data is stored in the form of bit streams having respective addresses. The storage regions of the graphic data are different according to the type of the graphic data, and the storage of the graphic data in the respective storage regions is performed in the order of the received SMS blocks. Thus, the respective SMS blocks are stored in their proper storage regions even if the received SMS blocks are in the wrong order. Specifically, if a plurality of SMS blocks that correspond to the graphic data of the same kind are sequentially received, they are stored in the corresponding storage regions in their receiving order to complete the original graphic data. If the SMS blocks are received in the wrong order, they are rearranged to be stored in their proper storage regions according to the order of information included in the respective SMS blocks to accurately complete the original graphic data. And, even if a plurality of SMS blocks that correspond to different kinds of the graphic data are received, they are rearranged as the blocks of the same kind and stored in their corresponding storage regions.

A graphic data storage section 38 is implemented by a flash memory typically used in the digital mobile station. A data decompression section 37 is additionally provided according to the embodiment of the present invention, and decompresses the data received and read out. The data decompression section 37 is typically called a decoder that decompresses the received data by a predetermined decompression method for the restoration of the original data. For instance, if the SMS blocks, which have been compressed by and transmitted from the data transmitting apparatus as shown in FIG. 2, are received, the original data of the received SMS blocks is restored by decoding the SMS blocks according to the run length coding (RLC) method. As described above, the decoded data is stored in the specified storage regions of the graphic data storage section 38. A graphic transmission data header analyzing and processing section 36 detects and analyzes distinction headers if the distinction headers are included in the receive SMS blocks. Specifically, if the distinction header is the data transmission header having the format as shown in FIG. 4, the graphic transmission data header analyzing and processing section 36 analyzes the contents of the data transmission header, so that the control operation of the control section 30 is performed accordingly.

Figure 4:
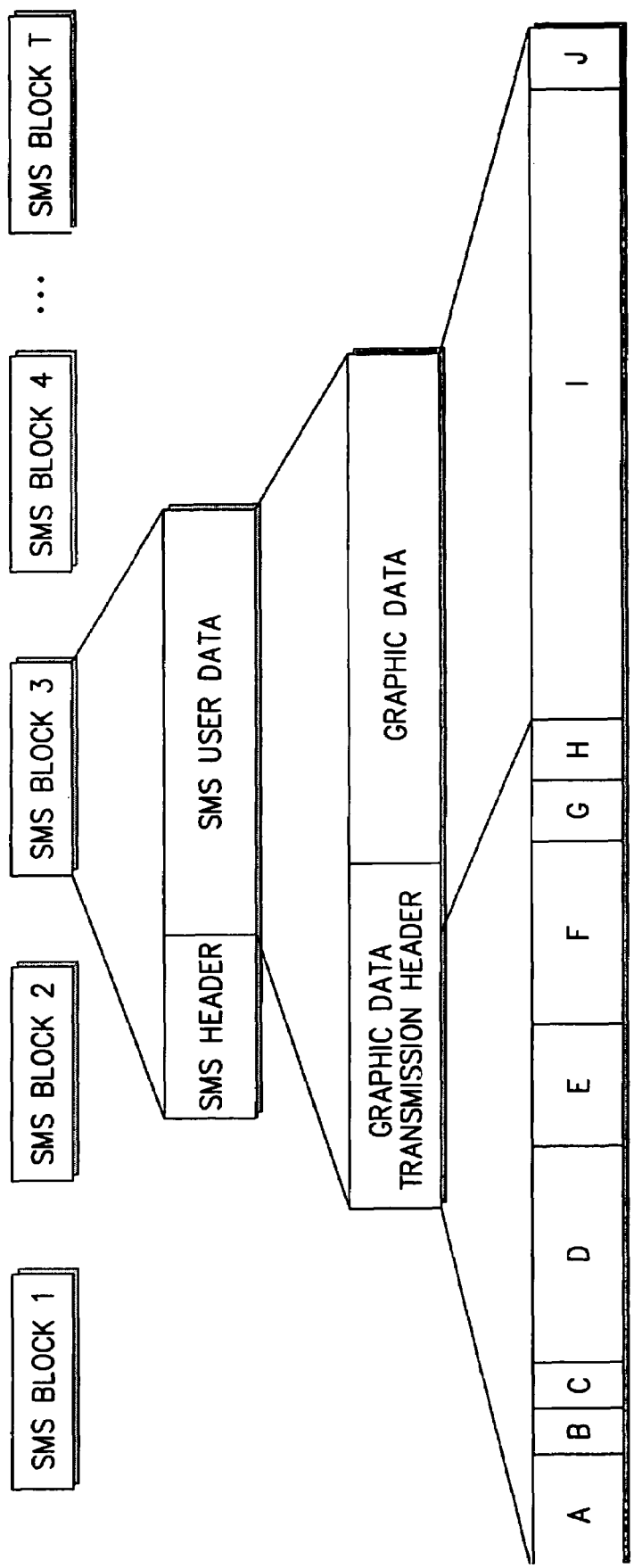
FIG. 4 is a view illustrating the data structure of a short message service block transmitted and processed according to the preferred embodiment of the present invention.

FIG. 4 is a view illustrating the data structure of a short message service block which is produced, transmitted, received, and analyzed by the data transmitting and receiving apparatuses as shown in FIGS. 2 and 3. According to the preferred embodiment of the present invention, the structure of the SMS block will be explained with the data transmission operation in reference to FIG. 4.

Initially, if the capacity of the graphic data exceeds a predetermined extent, the corresponding graphic data is reconstructed and transmitted as a plurality of SMS blocks by the data transmitting apparatus of FIG. 2. The respective SMS block is divided into an SMS header and an SMS user data field in the same manner as the typical SMS block. The SMS header is constructed in the form determined by the digital mobile terminal system. The SMS user data is divided into a graphic data transmission header field and a compressed graphic data field according to the embodiment of the present invention, where it includes the sentence as a coded state according to the conventional SMS.

Specifically, the graphic data transmission header is divided into fields of A, B, C, D, E, F, G, and H, and the graphic data field is divided into fields of I and J, as shown in FIG. 4. The A field includes a code for discriminating that the transmitted SMS block is the SMS block according to the graphic data transmission, and is allocated with 2 bytes. The B field represents the whole number of SMS blocks that constitute one graphic data to be transmitted. The C field represents the order of the SMS blocks to be transmitted. Even though the SMS blocks may be received in the wrong order, the B field identifies the order of the respective SMS block. In the embodiment of the present invention, the B and C fields are allocated with 4 bits, respectively. The D field represents a code for the distinction of the transmitting part, and the receiving part can recognize which transmitting part the graphic data is transmitted from by detecting the D field. The D field is allocated with 4 bytes. The E field represents a code for the distinction of the kinds of the graphic data, and the receiving part can recognize the kind of the received graphic data by detecting this code even if the SMS blocks according to the various kinds of graphic data are received from the same transmitting part. The F field is a field that is allocated for the extension in use, and the G code is a field representing the coding type, i.e., the type of compression. The receiving part can recognize the compression type of the transmitted data by detecting the G field. The H field is used also for extension, and the I field is a field containing actually compressed graphic data. Thus, the graphic data compressed and transmitted by the transmitting part is positioned in the I field, and this graphic data of the I field is restored to the original data by the receiving part. The graphic data subject to transmission may be composed of a plurality of blocks each of which corresponds to the size of the I field. The J field represents a block terminating code for indicating the termination of one block, and the receiving part recognizes the termination position of the corresponding SMS block by detecting the J code. In the embodiment of the present invention, the E, F, G, H, I, and J fields are allocated with 2 bytes, 3 bytes, 1 byte, 1 byte, n bytes, and 6 bits, respectively. The size of the I field is determined as the difference value between the size of the graphic data transmission header field and the size of the J field. Producing, transmitting, and receiving the SMS blocks as constructed above represent the process of the present invention.

Figure 5:
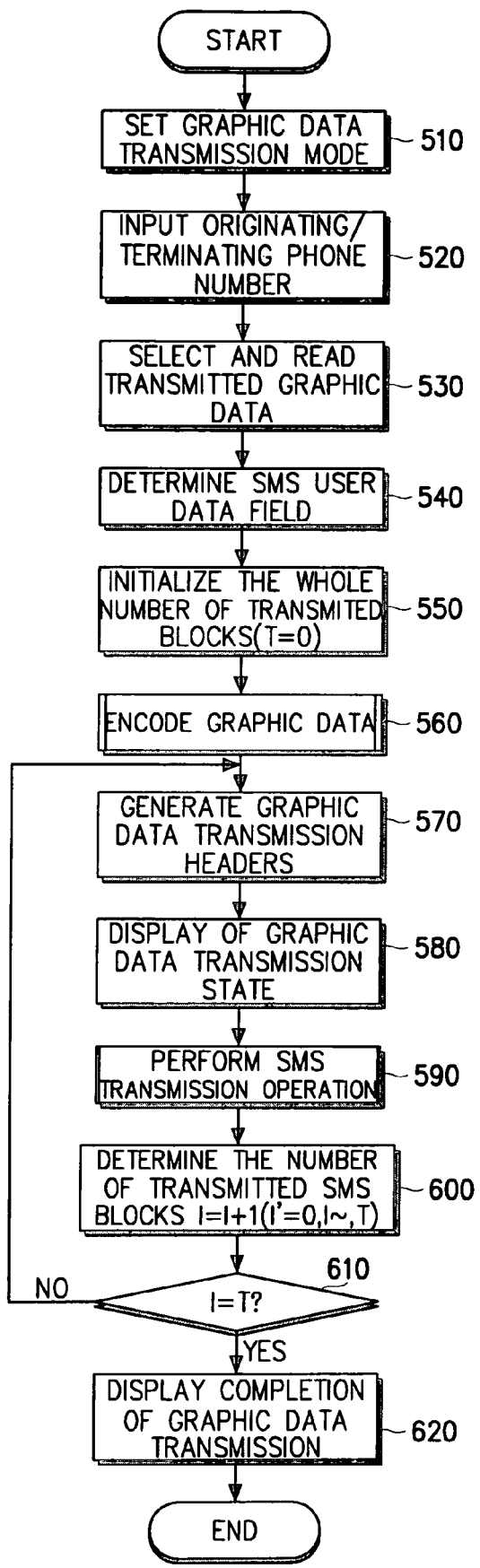
FIG. 5 is a flowchart illustrating a data transmitting method for a digital mobile station using a short message service according to the preferred embodiment of the present invention.
Figure 6A:
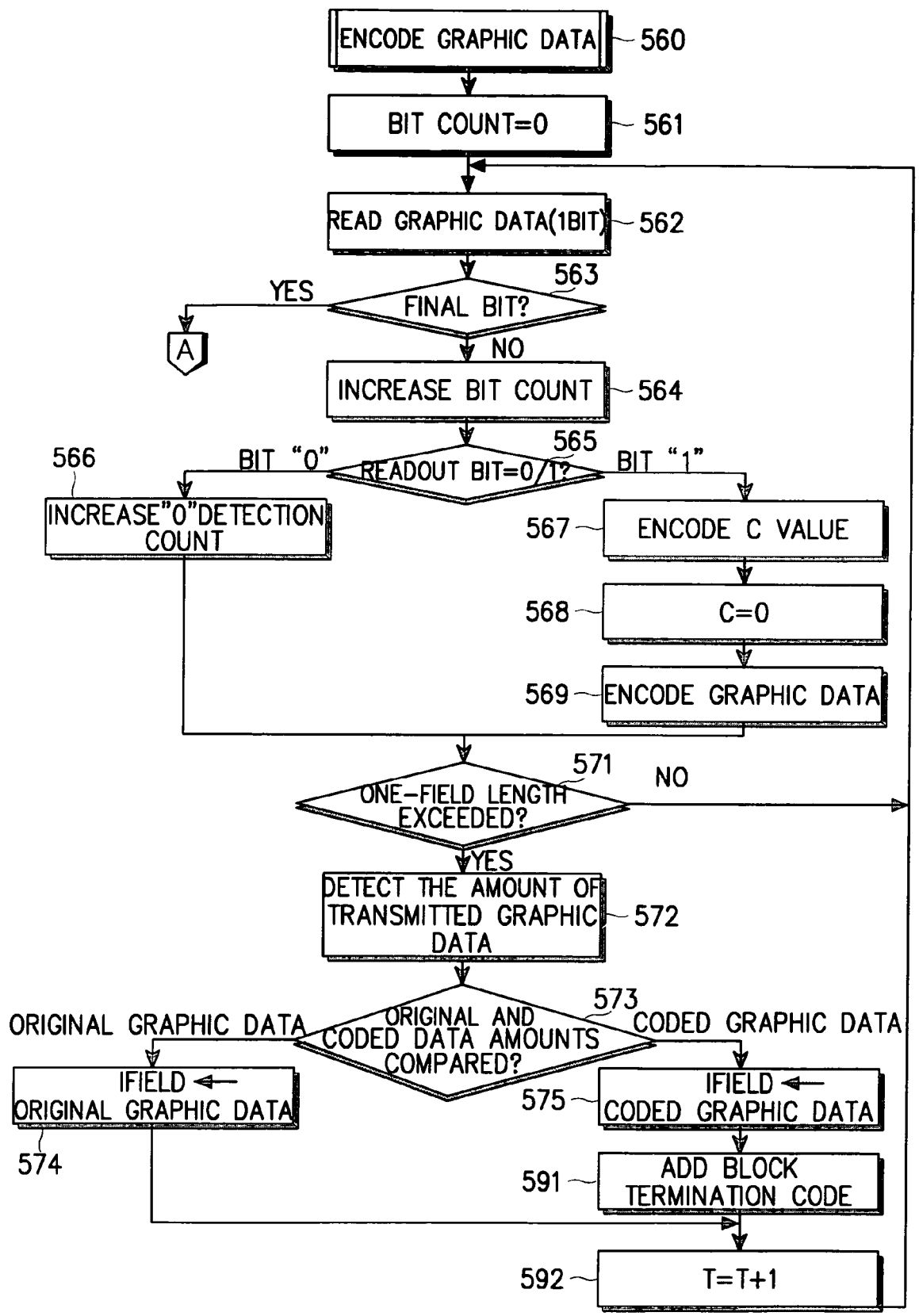
FIGS. 6A and 6B are flowcharts illustrating an encoding method of the data to be transmitted by the method shown in FIG. 5.
Figure 6B:
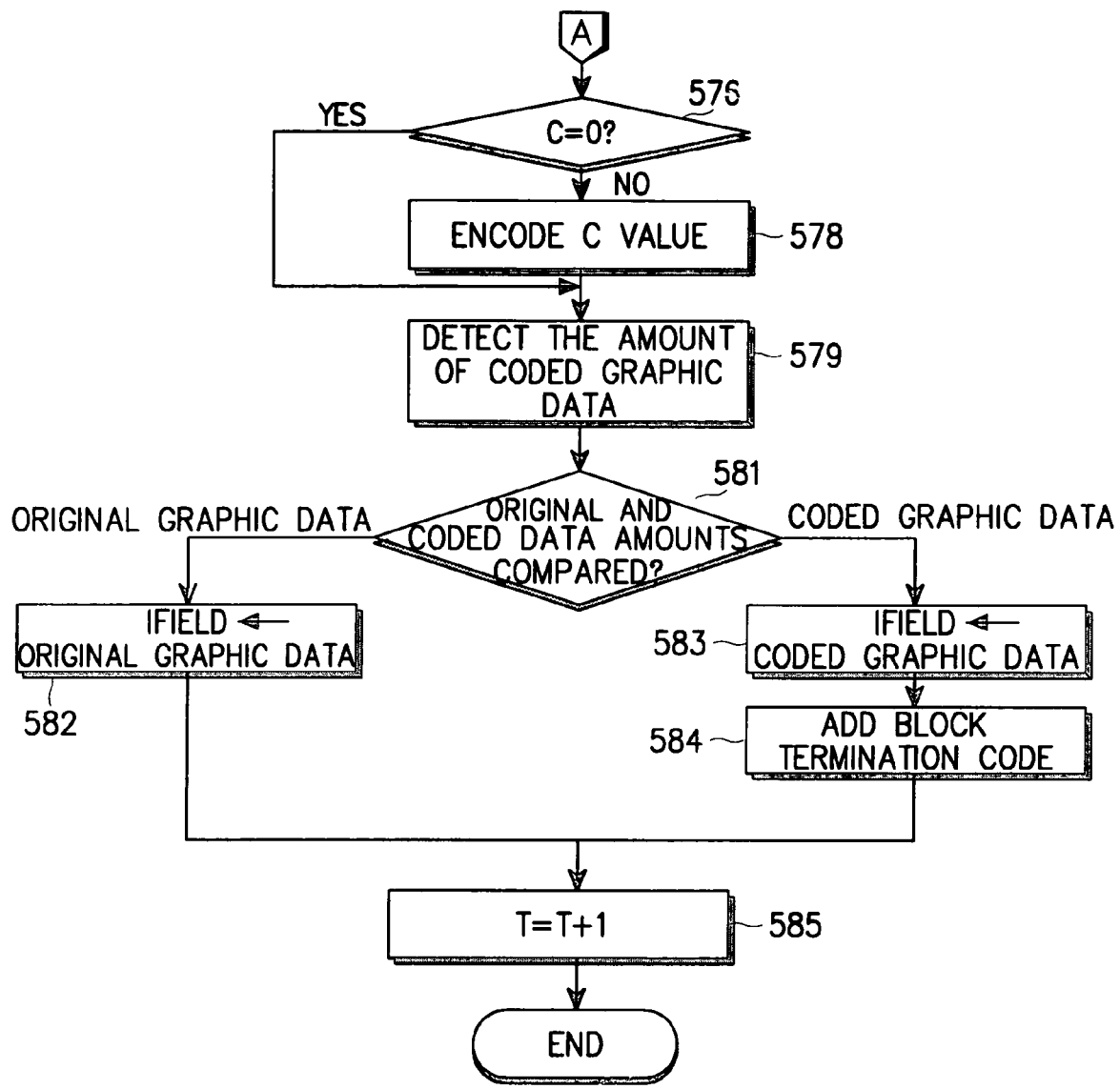

FIG. 5 is a flowchart illustrating a data transmitting method for a digital mobile station using a short message service according to a preferred embodiment of the present invention, and shows the operation of the data transmitting apparatus of FIG. 2. FIGS. 6A and 6B are a flowchart illustrating a transmitted data encoding method in FIG. 5, and shows the production of the SMS block structured as shown in FIG. 4.

Referring to FIGS. 5, 6A and 6B, the data transmitting method according to the present invention will be explained in detail.

First, if a graphic transmission mode is set by the user in step 510, the input of graphic data is performed. Specifically, the originating and terminating phone numbers are inputted in step 520, and the transmission graphic data to be transmitted is selected and read out in step 530. Then, the size of the SMS user data field is determined by the digital mobile station system in step 540. This value may be fixedly set by the SMS provider, or by the control signal exchange with the user or the base station. The operation in step 540 will be the basis of judging how many blocks constitute the graphic data in making the graphic data into the SMS blocks. For instance, if it is determined that the graphic data is of one Kbytes and the SMS user field is of 100 bytes, the graphic data should be made into at least 10 blocks, and such judgment is affected based on the operation result of step 540.

In step 550, the variable T, which represents the whole number of blocks to be transmitted, is initialized (T=0). In step 560, the graphic data selected and read out in step 530 is encoded according to the determined compression method and to meet the graphic data field, i.e., the I field of the SMS user data. The graphic data is converted into proper blocks by the encoding operation, and the number of the converted blocks is variably determined according to the data amount of the graphic data. In step 570, the graphic data transmission headers are generated and added to the respective produced blocks. The added graphic data transmission headers have the same structure as shown in FIG. 4, but have different contents of the transmission block order field C. The order of the respective transmitted SMS block is determined by the C field. As described above, since the graphic data is transmitted, being divided into blocks, it is required that the original graphic data should be correctly restored according to the order of the blocks. In other words, the plurality of SMS blocks are assembled to one graphic data according to the order of the C field.

In step 580, the data transmission state is displayed on a display screen, so that the user can visually recognize the data transmission state. For instance, the display of the data transmission state is performed with reference to the contents of the B field and the C field, that is, in the form of "C/B". In transmitting a plurality of SMS blocks corresponding to one kind of graphic data, the transmission of the first block is displayed as a "1/T" state, and the transmission of the second block is displayed as a "2/T" state. In step 590, an SMS transmitting operation is performed. Since such SMS transmitting operation is well known in the art a detailed explanation thereof will be omitted. The order (I) of the SMS transmission block is increased by 1 in step 600, and it is judged whether the order (I) is equal to the total number of blocks (T) in step 610. That is, it is judged whether the SMS block of the final order among the whole SMS blocks is transmitted. If I is not equal to T, this means that the transmission of the graphic data is not completed, and the operation of step 570 is repeatedly performed. If it is judged that I is equal to T in step 610, this means that the final SMS block is transmitted or the transmission of the graphic data is completed, and thus the state of completion of the graphic data transmission is displayed in step 620 to complete the graphic data transmission through the SMS. Consequently, according to the embodiment of the present invention, the data to be transmitted is read out and encoded, and the encoded data is made into SMS blocks, and then the SMS blocks are sequentially transmitted.

Meanwhile, the encoding process of the graphic data to be transmitted in step 560 will now be explained in detail with reference to FIG. 6A which shows the encoding method based on the run length coding.

Initially, the bit-count value is set as "0" in step 561. The graphic data is read bit by bit, and the bit-count value is increased according to the number of readout bits. In step 562, the graphic data is read out bit by bit, and it is judged whether the readout bit is the final bit of the graphic data, i.e., it is judged whether the bit that corresponds to the coordinate value of the final pixel of a picture in step 563. If the final bit is not detected in step 563, the bit-count value is increased by 1 in step 564. Then, it is judged whether the detected bit is "0" or "1". In the embodiment of the present invention, the bit "0" is designated as a white color of the graphic data, and the bit "1" as a black color of the graphic data. This follows the fact that the LCD of the typical mobile station can display only two colors of white and black. The reason why the bit "0" is designated as white c is that the white components exist more than the black components do in the graphic data in probability. If the readout bit is "0" as a result of detection in step 564, the value of the count (C) according to the detection of "0" is increased by 1 in step 566. This operation is for generating a run length code as a part of the compression operation according to the run length coding. If the readout bit is "1" as a result of detection in step 565, the run length coding of the counted value according to the detection of the previous bit "0" is affected in step 567, the counted value is initialized again in step 568, and then the coding of the graphic data to be transmitted is performed by adding the bit "1" detected in step 569 to a result of the run length coding. In other words, if the bit "0" is detected according to the run length coding, its detection number is counted, while if the bit "1" is detected, the bit "1" is added to the coding result of the number of "0" detection, and this result of addition is stored as the graphic data to be transmitted. The SMS provider may properly prepare a table for the coding of the detection number.

In step 571, it is judged whether the bit read out in step 565 is the final bit of the SMS block with reference to the result according to the determination of the SMS user data field. If it is judged that the bit is not the final bit of the SMS block in step 571, it means that the data coding is not completed with respect to the SMS block, and the operation of step 562 is repeated. However, if it is judged that the bit is the final bit of the SMS block, it means that the graphic data field is fully filled by the coded data to complete one SMS block, and thus the comparison of the transmitted data is performed in step 572. Specifically, the bit stream length of the coded compressed data is compared with that of the original data. This comparison is for selectively transmitting data with less amount of data since the data compressed according to the run length coding may have a larger amount of data than the original data. If it is judged that the graphic data has less data in step 573, the original data is determined as the data to be included in the graphic data field in step 574, and the total number of blocks is increased in step 581. However, if it is judged that the compressed data has less data than the original data in step 573 (this judgment is performed according to the length of the bit stream of the respective data), the compressed data is determined as the data to be included in the graphic data field in step 575, and then a block termination code of 6 bits is added thereto in step 579. As described above, the block termination code serves to indicate the end of one block. Thereafter, the operation of step 581 is performed in the same manner as described above.

Meanwhile, as shown in FIG. 6B, if the final bit of the transmitted graphic data, i.e., the bit corresponding to the final pixel, is detected in step 563, it is judged whether the "0"-detection count (C) is initialized to "0" in step 576. If so, the value of "0"-detection count is coded according to the run length coding in step 578, and then steps 579 and 581 to 585 are sequentially performed in the same manner as step 572, 573, 574, 575, 579, and 581, respectively. Thereafter, step 585 is performed to complete the graphic data encoding process.

Figure 7:
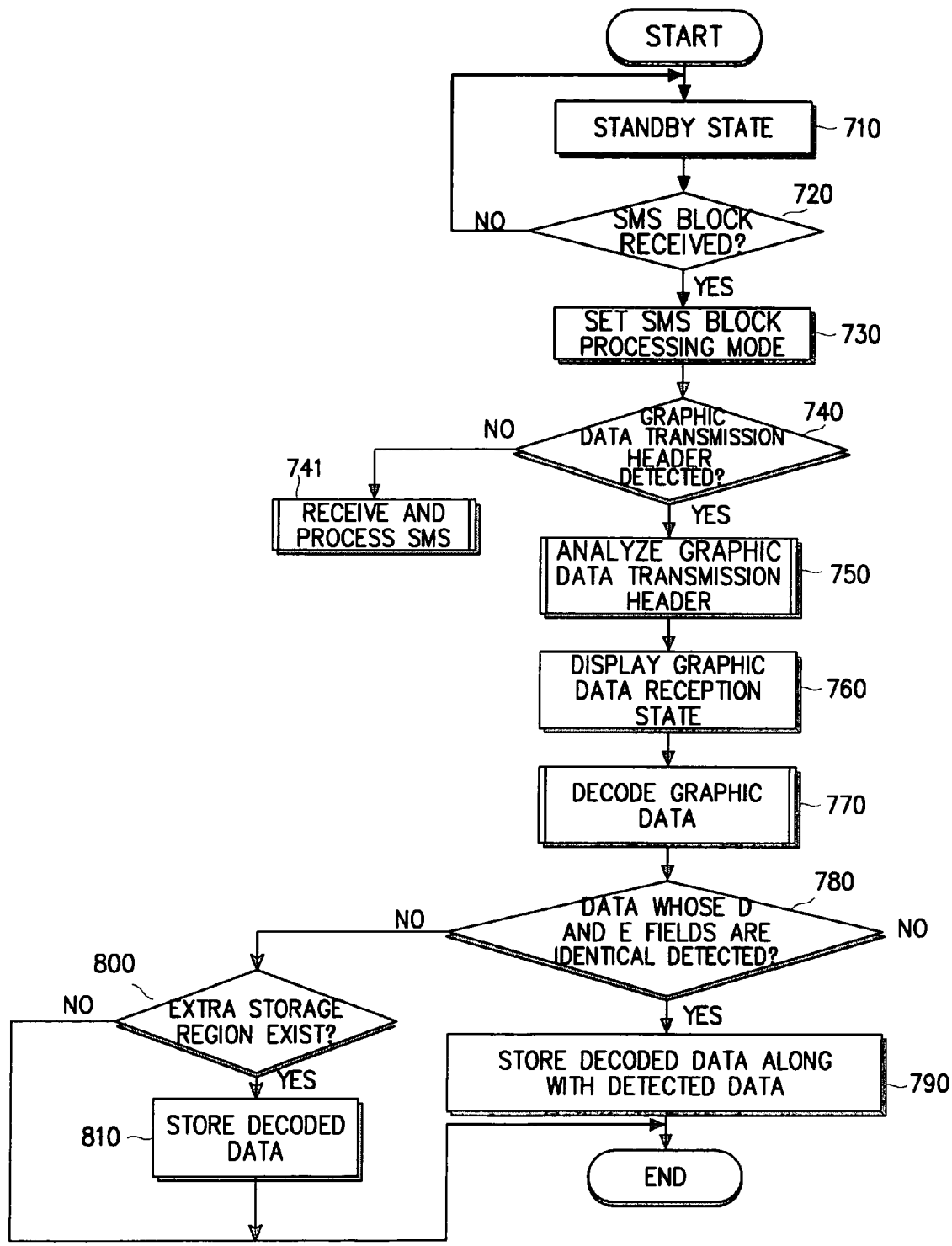
FIG. 7 is a view illustrating a data receiving method for a digital mobile station using a short message service according to the preferred embodiment of the present invention.
Figure 8A:
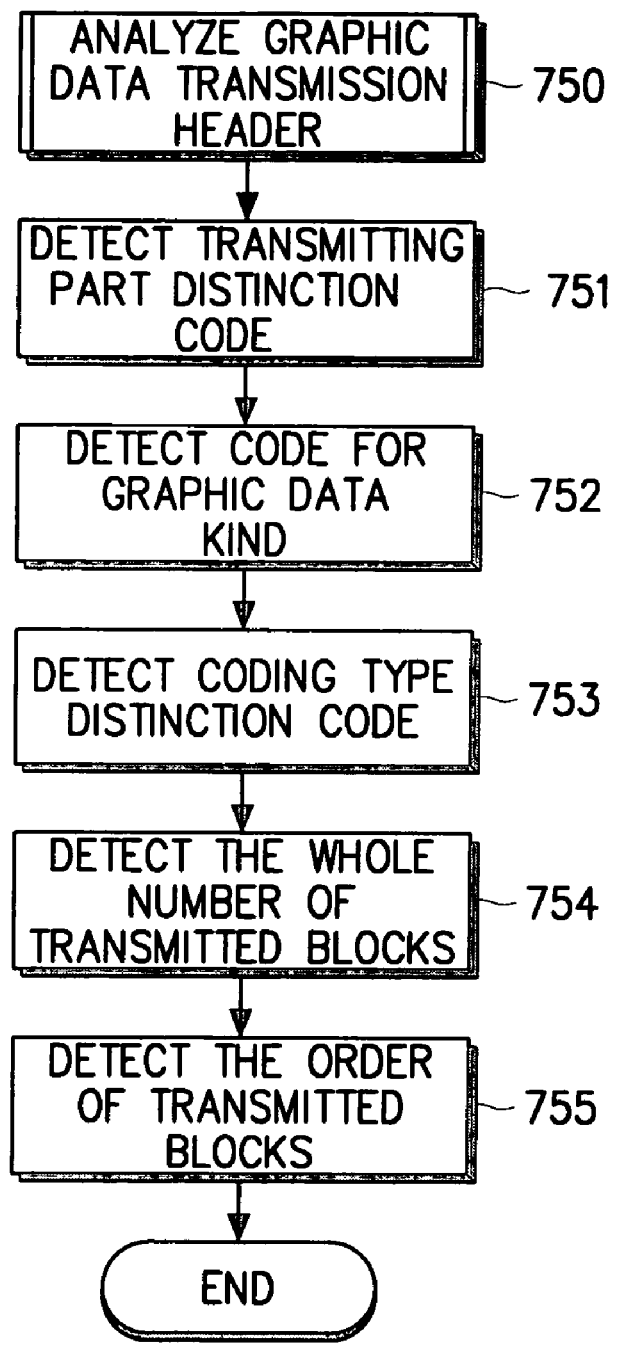
FIGS. 8A and 8B are flowcharts illustrating a transmitted data decoding method shown in FIG. 7; and, FIGS. 9A and 9B are views illustrating the display state of a digital mobile terminal according to the preferred embodiment of the present invention.
Figure 8B:
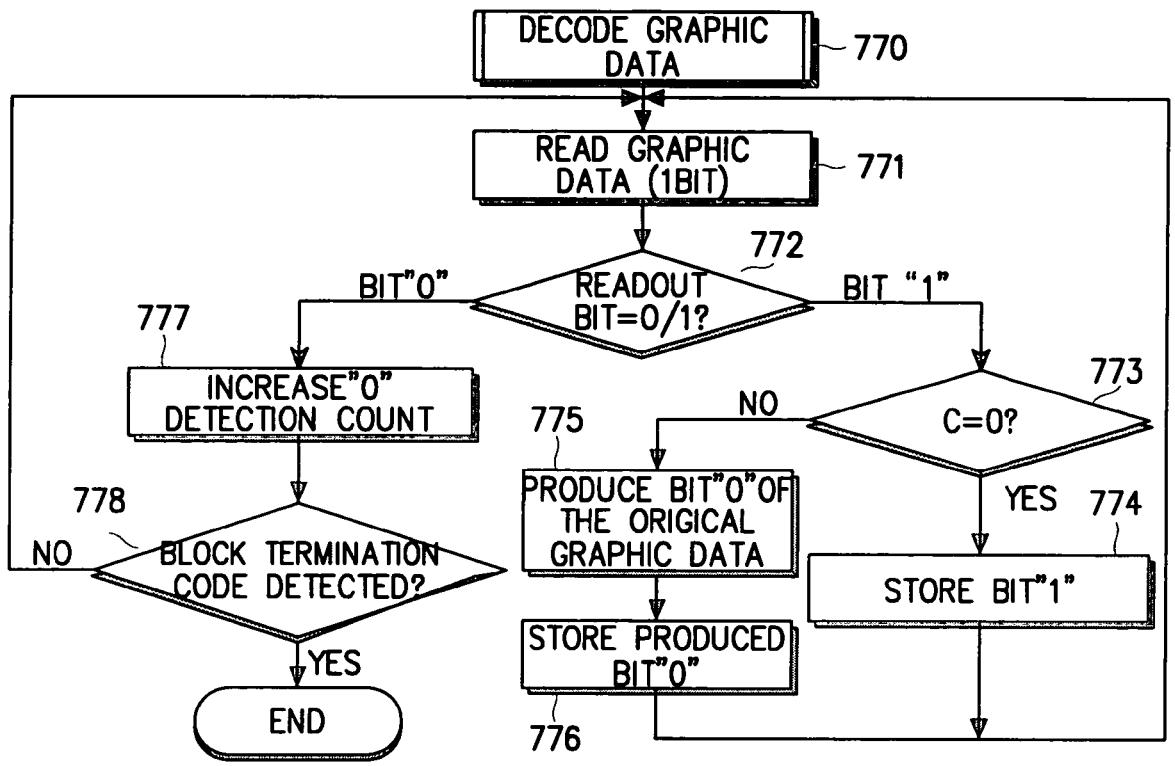
Figure 9A:
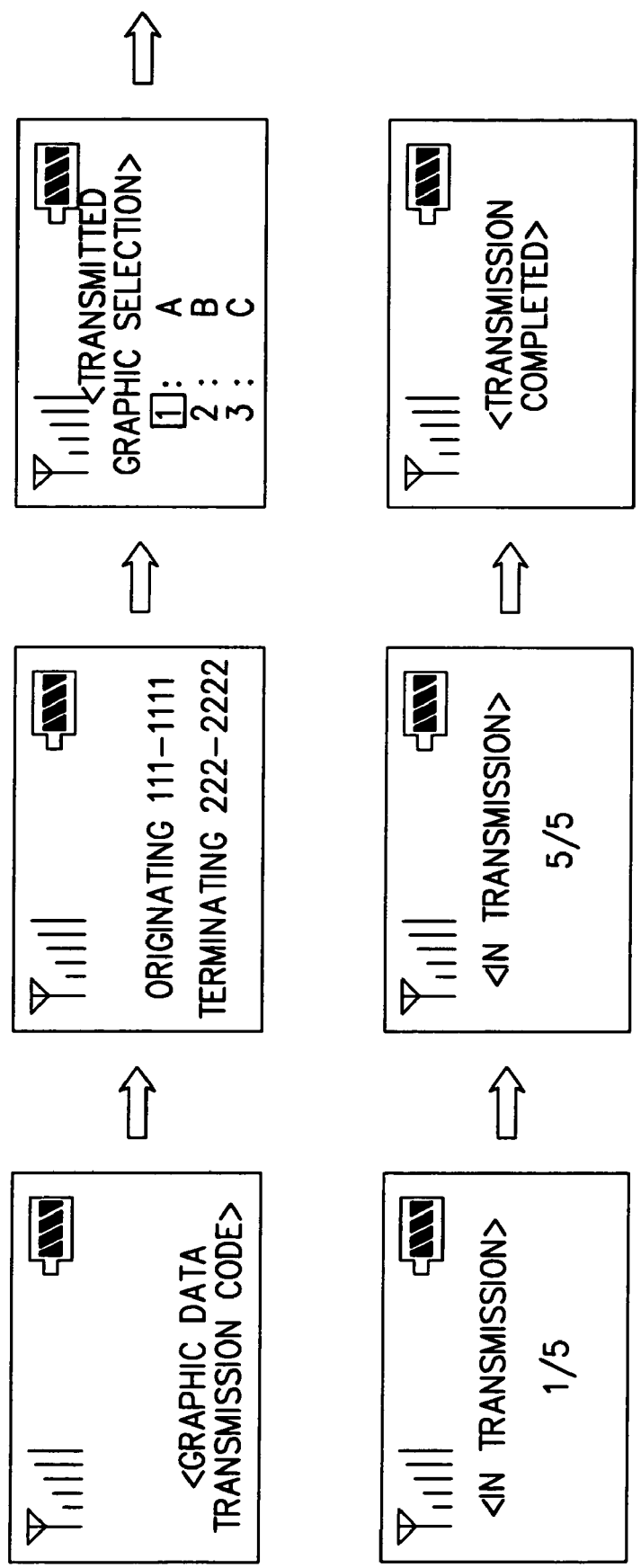

FIG. 7 is a view illustrating a data receiving method for a digital mobile station using a short message service according to a preferred embodiment of the present invention, and FIGS. 8A and 8B are flowcharts illustrating a transmitted data decoding method of FIG. 7 in more detail. The method illustrated in FIG. 7 is performed by the data receiving apparatus of FIG. 3.

Referring to FIGS. 7, 8A and 8B, the data receiving method for a digital mobile station according to the embodiment of the present invention will be explained in detail.

Initially, during a standby state of the digital mobile station in step 710, it is judged whether SMS blocks are received in step 720. If so, an SMS receiving mode is set in step 730, and it is detected whether graphic data transmission headers are included in the received SMS blocks in step 740. If it is detected that the graphic data transmission headers are included in the received SMS blocks, this means that the received blocks are not general SMS blocks, but are the blocks including compressed data. Thus, an analysis of the graphic data transmission headers is performed in step 750. Meanwhile, if the graphic data transmission headers are not detected in step 740, a general SMS block processing operation is performed in step 741. In step 750, the detection of the transmitting part distinction code (D field) (step 751), the code of the kind of the graphic data (E field)(step 752), the coding type distinction code (G field)(step 753), the total number of transmitted blocks (B field)(step 754), and the order of transmitted blocks (C field)(step 755) are sequentially performed. The kind and components of the transmitted SMS blocks can be recognized by the receiving part according to the respective detected code values.

In step 760, the receiving state of the SMS blocks is displayed with reference to the B field and the C field of the analyzed graphic data transmission header, so that the user can recognize the order of the SMS block currently received. In step 770, the received graphic data is decoded with reference to the G field. In step 780, it is judged whether the currently received SMS block is the block that follows the previously received SMS block, i.e., whether the code of the kinds of the graphic data of the currently received block is identical to that of the previously received block. If so, the graphic data decoded in step 770 is processed in connection with the graphic data of the SMS block previously processed and stored in step 790. As a result, the original graphic data is constructed by assembling the graphic data of the previous SMS block and the graphic data of the currently received SMS block. However, if it is judged that the currently received block is not the block following the previous block in step 780, this means that the currently received graphic data is the graphic data of a different kind or the graphic data transmitted from another transmitting part, and then it is judged whether any storage region exists in the graphic data storage section in step 800. If it is judged that there exists a storage region, the graphic data of the newly received SMS block is stored in step 810. If not, the receiving operation is terminated without storing the corresponding graphic data.

Meanwhile, the decoding operation of step 770 will be explained in detail with reference to FIGS. 8A and 8B.

During a decoding mode of the received graphic data in step 770, the graphic data is read out bit by bit in step 771. In step 772, it is judged whether the readout bit is "1" or "0". If the bit is "0", the value of the "0"—detection count is increased in step 777. In step 778, it is judged whether the block termination code is detected. If the block termination code is detected, the detection operation is terminated, while if not, the operation of step 777 is repeatedly performed. If the bit is "1" in step 772, it is judged whether the value of the "0"—detection count is "0" in step 773. If so, the bit "1" read out in step 773 is stored, as it is in step 774, and the operation of step 771 is repeatedly performed. If it is judged that the value of the "0"—detection count is not "0", the bit "0" of the original graphic data is produced through the value of the "0"—detection count according to the run length coding in step 775. In step 776, the bit "0" produced in step 775 is stored as it is, and the operation of step 771 is repeatedly performed. As a result, the decoding operation of the data compressed through the run length coding is completed.

As described above, the present invention provides the advantages that it can transmit and receive user information having a relatively large amount of data using a typical short message service between digital mobile stations which belong to a radio network. That is, the present invention can perform the mutual transmission and reception of the user information having a large amount of data between the originating and the terminating mobile stations without constructing a separate device or system for the transmission and reception of the user information.

Also, the present invention provides the advantages that it can transmit and receive information having a relatively large amount of data such as graphic data and audio data by overcoming the limited condition of the amount of transmitted data that the SMS implemented in the typical mobile station has. This can be affected by providing a new SMS block structure which enables the transmission and reception of the user information having a large amount of data between the mobile terminals, and this SMS block can be processed by the typical SMS block processing method.

Also, the present invention can provide a data compression method for a digital mobile station, which enables the user information having a large amount of data to be included in the SMS block in transmitting and receiving the user information using the SMS.

While this invention has been described in connection with what is presently considered to be the most practical and preferred embodiment, it is to be understood that the invention is not limited to the disclosed embodiment; on the contrary, it is intended to cover various modifications within the spirit and scope of the appended claims.

What is claimed is:

1. A data communication apparatus comprising:
a user input device;
a graphic data transmission header generator;
a controller configured for controlling reconstruction of graphic data for conveyance as compressed graphic data within a plurality of SMS blocks and for processing of the plurality of SMS blocks, said plurality of SMS blocks comprising compressed graphic data that has been divided and respectively arranged within the plurality of SMS blocks for conveying, each particular SMS block of the plurality of SMS blocks comprising a plurality of respective parts including an SMS header field and an SMS user data field, wherein the SMS user data field comprises a graphic data transmission header and compressed graphic data, the graphic data transmission header comprising a code field to indicate one of a plurality of types of graphic data, said controller being configured for causing the graphic data transmission header generator to generate said graphic data transmission header based on graphic data selected by means of the user input device during an SMS message transmission mode; and
a radio signal processor for communicating the SMS blocks.

2. The data communication apparatus of claim 1, wherein the graphic data transmission header further comprises a field for indicating a coding type of graphic data.

3. A data communication apparatus comprising:
a controller to control reconstruction of graphic data for conveyance as compressed graphic data within a plurality of SMS blocks and for processing of the plurality of SMS blocks, said plurality of SMS blocks comprising compressed graphic data that has been divided and respectively arranged within the plurality of SMS blocks for conveying, each particular SMS block of the plurality of SMS blocks comprising a plurality of respective parts including an SMS header and SMS user data, wherein the SMS user data comprises a graphic data transmission header and compressed graphic data, the graphic data transmission header comprising a code field to indicate one of a plurality of types of graphic data associated with graphic data contained in the SMS user data; and
a radio signal processor for communicating the SMS blocks,
wherein the graphic data transmission header further comprises a field for indicating a total number of the SMS blocks to be communicated in response to inputted graphic data by a user and a field for a transmitting order of the communicated SMS blocks.

4. A data communication method in a communication system supporting Short Message Service (SMS), said method comprising the steps of:
processing a plurality of SMS blocks comprising graphic data that has been divided and respectively arranged within the plurality of SMS blocks for conveying as compressed graphic data, each particular SMS block of the plurality of SMS blocks comprising a plurality of respective parts including an SMS header and an SMS user data, wherein the SMS user data comprises a graphic data transmission header and compressed graphic data, the graphic data transmission header comprising a code field to indicate one of a plurality of types of graphic data associated with graphic data contained in the SMS user data, said processing comprising generating said graphic data transmission header based on graphic data selected by a user of the communication system during an SMS message transmission mode; and communicating the SMS blocks in the communication system.

5. The data communication method of claim 4, wherein the communicating the SMS blocks comprises transmitting the SMS blocks to a receiving party.

6. The data transmitting method as claimed in 5, further comprising displaying, on a display, an indication of a completion in the transmitting of the SMS blocks.

7. The data communication method of claim 4, wherein the communicating the SMS blocks comprises receiving the SMS blocks generated from a mobile station.

8. The data communication method of claim 4, wherein the processing the SMS blocks further comprises reading out the graphic data from a memory in a mobile station.

9. The data communication method of claim 4, wherein the processing SMS blocks includes generating black and white graphic data.

10. The data communication method of claim 4, wherein the graphic data transmission header further comprises a field for indicating a total number of SMS blocks to be communicated in response to inputted graphic data by a user and a field for a transmitting order of the communicated SMS blocks.

11. A data communication method in a communication system supporting Short Message Service (SMS), said method comprising the steps of:
processing a plurality of SMS blocks comprising graphic data that has been divided and respectively arranged within the plurality of SMS blocks for conveying as compressed graphic data, each particular SMS block of the plurality of SMS blocks comprising a plurality of respective parts including an SMS header and SMS user data, wherein the SMS user data comprises a graphic data transmission header and a compressed graphic data, the graphic data transmission header comprising a code field to indicate one of a plurality of types of graphic data associated with graphic data contained in the SMS user data;
communicating the SMS blocks in the communication system, wherein the communicating the SMS blocks comprises transmitting the SMS message to a receiving party; and
displaying a status of progress in the transmitting of the SMS blocks on a display.

12. A data communication method in a communication system supporting Short Message Service (SMS), said method comprising the steps of:
entering an SMS message processing mode;
processing a plurality of SMS blocks comprising compressed graphic data that has been divided and respectively arranged within the plurality of SMS blocks for conveying compressed graphic data, each particular SMS block of the plurality of SMS blocks comprising a plurality of respective parts including an SMS header and SMS user data, wherein the SMS user data comprises a data transmission header and data, the data transmission header comprising a code field to indicate one of a plurality of types of data associated with data contained in the SMS user data, said processing comprising generating said data transmission header based on data selected by a user of the data communication system during an SMS message transmission mode; and communicating the SMS blocks in the communication system.

13. The method of claim 12, wherein the plurality of types of data includes a graphic data and an audio data.

14. A data communication apparatus, comprising: a memory; and a processor operatively coupled to said memory, said processor configured to: select graphic data to be transmitted as compressed graphic data in an SMS message; generate SMS data transmission headers corresponding to said selected graphic data, said SMS data transmission headers comprising at least one field for the distinction of a kind of transmitted compressed data for each selection of graphic data; compress and form said selected graphic data and said SMS data transmission headers into SMS user data; and combine said SMS user data with at least one SMS header for transmission as an SMS message; wherein said SMS message comprises the compressed graphic data that has been selected and respectively arranged within the SMS message.

15. The data communication apparatus of claim 14, wherein said SMS user data comprises graphic data and plain SMS text data.

16. The data communication apparatus of claim 14, wherein said SMS user data comprises audio data and plain SMS text data.

17. The data communication apparatus of claim 14, wherein said SMS user data comprises graphic data, audio data, and plain SMS text data.

18. The data communication apparatus of claim 15, wherein said selected graphic data and said plain SMS text data are displayed as part of a single SMS message.

19. The data communication apparatus of claim 14, wherein said selected data comprises more than one discrete piece of audio data.

20. The data communication apparatus of claim 14, wherein said selected data comprises more than one bitmap image.

21. The data communication apparatus of claim 14, wherein said selected data comprises at least one graphic image and at least one discrete portion of audio data.

22. A data communication apparatus comprising, a memory; and a processor operatively coupled to said memory, said processor configured to: process SMS user data from a received SMS message, said SMS user data containing compressed graphic data that has been previously selected; and process at least a portion of said SMS user data contained in said SMS message according to one or more SMS data transmission headers corresponding to said compressed graphic data, each of said one or more SMS data transmission headers being located in said SMS user data and comprising a field for the distinction of a kind of transmitted data for each selection of graphic data; wherein said received SMS message comprises the compressed graphic data that has been selected and respectively arranged within the SMS message.

23. The data communication apparatus of claim 22, wherein said SMS user data comprises graphic data and plain SMS text data.

24. The data communication apparatus of claim 22, wherein said SMS user data comprises audio data and plain SMS text data.

25. The data communication apparatus of claim 22, wherein said SMS user data comprises graphic data, audio data, and plain SMS text data.

26. The data communication apparatus of claim 23, wherein said graphic data and said plain SMS text data are displayed as part of a single SMS message.

27. The data communication apparatus of claim 22, wherein said SMS user data comprises more than one discrete piece of audio data.

28. The data communication apparatus of claim 22, wherein said SMS user data comprises more than one bitmap image.

29. The data communication apparatus of claim 22, wherein said SMS user data comprises at least one graphic image and at least one discrete portion of audio data.

30. A method of constructing an SMS message, the method comprising the steps of: selecting graphic data for compression to be transmitted as an SMS message; generating SMS data transmission headers corresponding to said selected graphic data, said SMS data transmission headers comprising at least one field for the distinction of a kind of transmitted compressed data for each selection of graphic data; and combining SMS user data with the SMS data transmission headers in a predetermined amount of SMS blocks; wherein said SMS blocks comprise compressed graphic data that has been selected and respectively arranged within the SMS blocks.

31. The method of claim 30, wherein the SMS blocks contain text that has been inputted by a user composing the SMS message.

32. The method of claim 30, wherein said SMS user data comprises graphic data and plain SMS text data.

33. The method of claim 30, wherein said SMS user data comprises audio data and plain SMS text data.

34. The method of claim 30, wherein said SMS user data comprises graphic data, audio data, and plain SMS text data.

35. The method of claim 34, wherein said graphic data and said plain SMS text data are displayed as part of a single SMS message.

36. The method of claim 30 wherein said SMS user data comprises more than one discrete piece of audio data.

37. The method of claim 30, wherein said SMS user data comprises more than one bitmap image.

38. The method of claim 30, wherein said SMS user data comprises at least one graphic image and at least one discrete portion of audio data.

39. A method of processing a received SMS message, the method comprising the steps of: receiving an SMS message; processing SMS user data from said received SMS message, said SMS user data containing compressed graphic data that has been previously selected; and processing at least a portion of said SMS user data contained in said SMS message according to one or more SMS data transmission headers corresponding to said compressed graphic data, each of said one or more SMS data transmission headers being located in said SMS user data and comprising a field for the distinction of a kind of transmitted compressed data for each selection of graphic data; wherein said received SMS message comprises the compressed graphic data that has been selected and respectively arranged within the SMS message.

40. The method of claim 39, wherein said SMS user data comprises graphic data and plain SMS text data.

41. The method of claim 39, wherein said SMS user data comprises audio data and plain SMS text data.

42. The method of claim 39, wherein said SMS user data comprises graphic data, audio data, and plain SMS text data.

43. The method of claim 42, wherein said graphic data and said plain SMS text data are displayed as part of a single SMS message.

44. The method of claim 39, wherein said SMS user data comprises more than one discrete piece of audio data.

45. The method of claim 39, wherein said SMS user data comprises more than one bitmap image.

46. The method of claim 39, wherein said SMS user data comprises at least one graphic image and at least one discrete portion of audio data.

* * * * *